United States Patent
Rajapakse

[11] Patent Number: 6,132,783
[45] Date of Patent: Oct. 17, 2000

[54] METHOD OF COOKING BONE-IN POULTRY FOOD ITEMS

[76] Inventor: Vinodh N. Rajapakse, 35950 Timberlane Dr., Solon, Ohio 44139

[21] Appl. No.: 09/350,897

[22] Filed: Jul. 12, 1999

[51] Int. Cl.[7] .............................. H05B 6/80; A23C 3/07
[52] U.S. Cl. ...................... 426/243; 99/443 C; 99/451; 219/731
[58] Field of Search ................................... 426/243, 466; 99/362, 443 C, 451; 219/731

[56] References Cited

U.S. PATENT DOCUMENTS

| 3,920,944 | 11/1975 | Constable . | |
|---|---|---|---|
| 4,342,788 | 8/1982 | Clatfelter . | |
| 4,409,453 | 10/1983 | Smith | 219/10.55 |
| 5,272,299 | 12/1993 | Ovadia | 219/10.55 R |
| 5,286,504 | 2/1994 | Sheen et al. . | |
| 5,384,140 | 1/1995 | Gagel et al. . | |
| 5,512,312 | 4/1996 | Forney et al. | 426/523 |
| 5,676,044 | 10/1997 | Lava, Jr. | 99/331 |

Primary Examiner—Nina Bhat
Attorney, Agent, or Firm—Vickers, Daniels & Young

[57] ABSTRACT

A continuous conveyor oven process for fully cooking bone-in poultry food items is provided. A single conveyor line is provided at a constant belt speed having a first microwave oven stage and a second convection oven stage, each stage includes an infeed end and a discharge end. The bone-in poultry food item is cooked within the first microwave stage to an outlet temperature and is discharged to a convection oven, wherein the bone-in poultry food item continues to be cooked to a convection out temperature at its discharge end. The bone-in poultry food item from the microwave infeed end to the convection oven discharge end is conducted at a constant belt speed for improved throughput and food item yield with improved consistent food item quality.

15 Claims, 4 Drawing Sheets

METHOD OF COOKING BONE-IN POULTRY FOOD ITEMS

The invention relates to a cooking process of cooking bone-in poultry food items during a continuous conveying process through oven sections arranged in a specific sequence.

BACKGROUND OF THE INVENTION

A food processing line for meat, poultry or seafood can be generally described as one that includes a sequence of processing steps. The proper sequence of steps is configured in a given order, together with the correct choice of equipment, operating parameters for each piece of equipment, ingredients and formulations, to all provide a basis for altering the final product outcome. This complex scheme allows the individual food processor to fulfill unique market needs to various food items. Within the above framework, there are other complexities associated with processing food items. The design must include provisions for the type of equipments to be used. Design parameters might include the surface cooking desired, the depth of heat transfer required, and the aesthetics of the food item.

In large scale food processing systems, the primary objective of an oven system is to provide the desired food characteristics of a given food item within the shortest time to obtain the greatest output or throughput of product. Another variable which will affect output is to deliver the greatest amount of output for a fixed footprint of space. In traditional convection oven systems, a continuous running conveyor is conventionally used to introduce food items to the oven on a continuous basis, with the conveyor running from the entrance or inlet opening to an outlet or exit opening associated with the oven. Such systems have included the use of both linear and spiral or helical conveyors. These ovens accommodate a large amount of food items therein, and provide the determined dwell time to allow thorough and complete cooking of any particular type of food item desired.

The cooking atmosphere of such linear or spiral convection ovens is conventionally provided by means of burner units which introduce a heated gas cooking medium by means of a flame source or alternatively, indirect heating through gas fire to air or thermal fluid to air heat exchange. This can often be supplemented with steam injected into the oven chamber. In an oven atmosphere containing high moisture content, the cooking rate is considerably enhanced by a condensing heat transfer mechanism, which improves the heat delivered to the surface of the food items until the surface temperature of the food item remains below the dew point temperature of the oven atmosphere. However, the overall heating of the core temperature of the food item is still very much controlled by the conduction resistance posed by the food item. The thicker and/or denser the food item, the greater the predominance of conduction resistance.

The above shortcomings have necessitated research and use of other heat transfer mechanisms, such as radio frequency wave, microwave, and infrared heating for continuous cooking of food items. An example of this can be seen in Gagel, et al. U.S. Pat. No. 5,384,140, Constable U.S. Pat. No. 3,920,944, and Sheen, et al. U.S. Pat. No. 5,286,504. These processes are attractive due to the speed and the way the heating of the food occurs. For example, with radio frequency waves and microwaves, the heating of the food item takes place with energy coupling of the whole product. This means heating of the surface and the core of the product takes place concurrently, albeit at different rates. As is well known, the microwave cooking process generally cooks meat pieces from the inside out. Although the process itself is relatively simple, there are many other peculiarities associated with these mechanisms that have kept them away from predominant use in the food industry.

For example, microwave cooking does not generally allow for browning of the food item on the exterior surface. Deceptor sheet material or hot plates, such as shown in Constable '944, have been used to limit the depth of penetration of the microwave energy into the food, thus enabling browning. Other attempts include infrared or radiant heating elements within the microwave ovens to brown the surface of the food while the microwave energy cooks the interior regions. Additionally, simple microwave cooking of fibrous meat pieces usually results in a dry end product not acceptable to the consumer. The moisture within the meat vaporizes as it absorbs the microwave energy to which the meat is exposed. It has been proposed, as for example Gagel, et al. '140, to coat microwaveable meat with an aqueous solution which forms a starch and protein cross-linked skin-like film that controls the heating rate and the microwave penetration depth so that microwave energy absorption is at least initially higher at the film than in the interior of the meat.

Further problems in the prior art are represented by Sheen '504, which recognizes that conventional microwave cooking of food stuffs having a coating such as battered or breaded chicken, usually results in a soggy texture at the outer surface of the food due to moisture migration from inside the food stuffs during microwave cooking. The migration moisture mixes with the oil of the coating at the outer food surface, the effect being to slow the heating rate down to prevent the surface temperature from exceeding 100° C. Only when all or most of the moisture has migrated from the food interior and has been evaporated from the food exterior does the outer food surface temperature exceed 100° C. By this time, however, the food has a relatively dry and unappetizing interior. In order to solve this problem, Sheen et al. '504 proposes applying an edible hydrophilic lossly susceptor to a portion of the surface of the food bearing a moisture-retardant edible barrier layer.

Another method, recognized for cooking chicken parts, is disclosed in Clatfelter U.S. Pat. No. 4,342,788. Therein, battered chicken parts are cooked in hot cooking oil within a fryer for a substantial period of time, and then the completed cooking of the interior portion of the chicken part is done by microwave cooking for a shorter period of time. This batch method utilizes initial cooking of the battered chicken for a period of time sufficiently long to accomplish the desired browning, crisping, and dehydration of the exterior surface, followed by a relatively short high-powered application of microwave energy affecting the interior of the meat and completing the cooking to the optimum degree. However, the above referenced batch method is inefficient, as recognized by the later patents, described above, which have attempted to duplicate batch method cooking in a single microwave process.

SUMMARY OF THE INVENTION

The present invention advantageously provides an improved cooking process which combines a microwave stage and a convection oven stage on a single conveyor line to fully cook bone-in poultry food items. The invention overcomes the disadvantages of prior art food processing methods by using each oven stage to its full advantage without the prior art drawbacks, all on a single conveyor line. In contrast, the prior art attempts to adapt a single oven to perform multiple tasks for which it is ill-suited. Applicant's invention improves the overall process time of batch method cooking, while delivering all of the advantages of batch method cooking in an improved output or throughput and food item yield of cooked poultry.

In this respect, a conveyor oven process is provided for fully cooking bone-in poultry food items. It comprises the initial step of providing a single conveyor line at a constant belt speed. On the single conveyor line is a first microwave oven stage and a second convection oven stage. Each of the stages includes an infeed end and a discharge end. Within the first microwave stage, microwave cooking of the bone-in poultry food items is conducted to an acceptable temperature, preferably 160° F. at the substrate adjacent to the bone. Thus, when the poultry food item reaches the discharge end, the bone marrow is higher than 170° F. while the outside surface is noticeably cooler. The poultry food item is then conveyed to the convection oven stage. As the poultry food item moves through the convection oven stage, its temperature increases from the outside surface inward to an acceptable temperature, wherein the poultry food item is cooked at the exterior and sufficiently browned. The entire process allows the bone-in poultry item to be conveyed at a relatively constant speed through each of the successive oven stages, whereby the poultry food items are fully cooked.

The increased output of the invention results from the shorter process time of the overall process. Additionally, greater yields and lower weight loss from the poultry product is obtained as a result of reduced fat rendering and lower moisture loss that arise from the precise operating parameters used in each of the processing steps. In effect, Applicant's invention allows for both improved throughput as well as output end yield of food items arising from lowering the final cook temperature of the substrate. This is accomplished since the invention does not require overcooking of the substrate to achieve adequate cooking of the outer surfaces by microwave.

One of the concerns in poultry cooking is the aesthetic nature of the cooked chicken product at the bone. Heating by conventional processes generally requires a temperature of 185° F. to 190° F. at the bone marrow for approximately one minute to change the color of residual blood to brown. However, radio frequency or microwave heating can accomplish this result at about 160° F. core temperature (i.e. adjacent to the bone). The bone marrow temperature is at 170° F. This temperature is held at 170° F. for greater than five minutes by the continuation of heating provided in the convection oven stage, which heats from the outside in. This lowering of the final food item cook temperature at the bone is made possible by triggering the chemical reaction which transforms the color from red to purple or brown to occur earlier in the process relative to current processing methods. The process also allows protein denaturization due to overcooking of food items relative to currently used methods to be minimized. Thus, a commercially viable conveyor oven for coated and uncoated bone-in poultry items that uses completely independent and different heat transfer mechanisms in at least a two-zone oven arrangement is provided by Applicant. While the preferred embodiment includes using a microwave oven and a convection oven, other possibilities are also apparent, including the use of linear RF oven sections in place of the microwave oven, and/or a high humidity spiral oven in place of the high-humidity convection oven.

Yet another object of the present invention is to provide a cooking process that will significantly reduce dwell while improving food item yield by lowering 20° from the final cook temperature.

In a preferred embodiment, a third stage is contemplated in which a fryer is initially used to set a coating to the poultry as a first step. The RF or microwave oven is then used as a second step and the high-humidity convection section is the final step for coated bone-in poultry food items.

As described above, the process invention first takes raw, uncooked, uncoated bone-in poultry food items through a conveyor microwave oven section and then through a conveyor high-humidity convection oven, preferably a linear or spiral conveyor section within the convection oven, for the purpose of fully cooking the food items. The food items which enter the above system are to be at a core temperature within a prescribed tolerance for all items across the belt width. The inventive process enables the food items to exit the system with a lower standard deviation of temperatures across the belt width relative to any current process.

It is thus an outstanding object of the present invention to provide a continuous multi-step conveyorized cooking process for cooking bone-in poultry food items using a combination electrotechnology oven as a single step in combination with a second condensation convection oven as a second step to deliver a higher output yield of poultry items.

It is yet another object of the present invention to provide a cooking process which prepares a final food item in less time by lowering the temperature up to 20° F. without compromising the food quality.

Yet still another object of the present invention is to provide an improved cooking process for poultry food items which produces cooked poultry at lower operating costs, while minimizing waste produced relative to currently used processing methods for bone-in food items.

Still another object of the present invention is to provide a cooking process which delivers at least 15% more output of fully-cooked bone-in poultry food items for a given footprint of plant space relative to currently used processing methods.

Another object of the present invention is to provide a cooking process for bone-in poultry food items which delivers at least 5% additional substrate yield for fully-cooked coated bone-in poultry food items relative to currently used food processing methods.

These and other objects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof and wherein.

DESCRIPTION OF THE PREFERRED EMBODIMENTS

Figure 1:
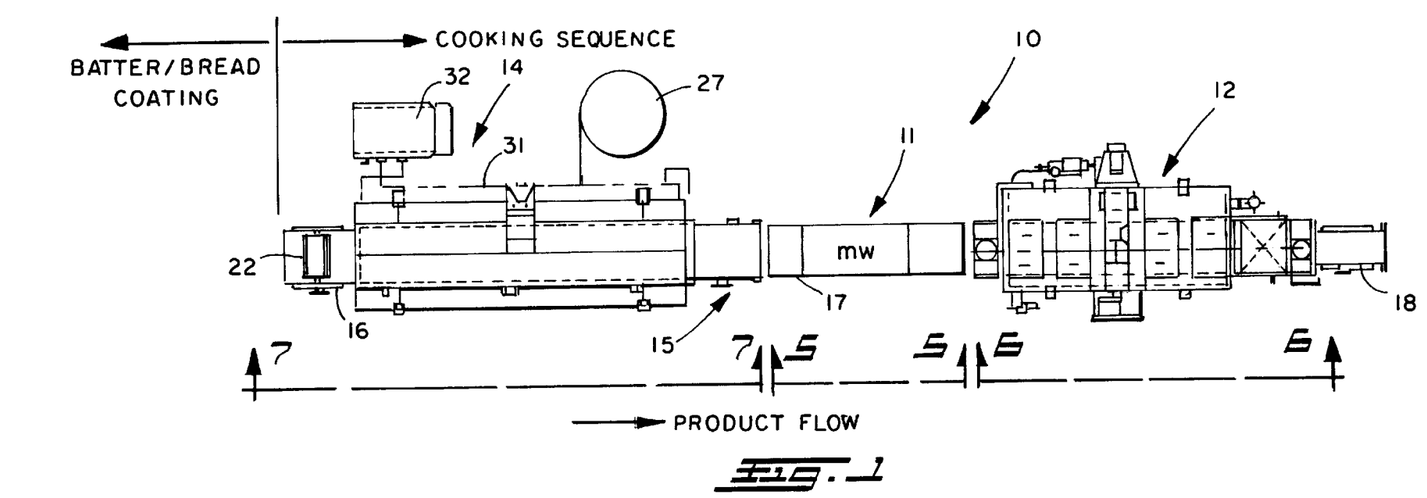
FIG. 1 is a plan view of the cooking apparatus allowing practice of the present invention.
Figure 2:
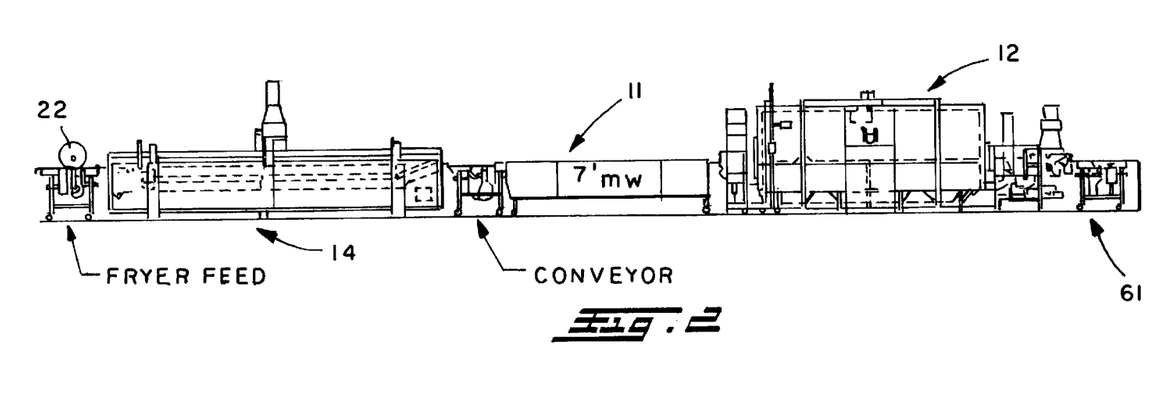
FIG. 2 is an elevation view of the apparatus of FIG. 1.

Referring now to the drawings, wherein the showings are for the purpose of illustrating the preferred embodiment of the invention only and not for the purpose of limiting same, FIGS. 1 and 2 show conveyor oven 10 comprising a single cavity commercial microwave oven 11, a high-humidity convection oven 12, and a fryer tank 14. As shown, a conveyor 15 is comprised of a fryer belt 16, a microwave belt 17, and a convection belt 18 that runs through each of fryer tank 14, microwave oven 11 and convection oven 12, respectively. Each conveyor belt has a 40-inch belt width, and can be maximized up to 58 inches. As shown, a bone-in chicken product 22 enters fryer belt 16 at an infeed end 23 and exits at a product discharge end 24. Fryer belt 16 dips within tank section 25 filled with cooking oil 26 supplied from oil reservoir 27 and recirculated through recirculation lines 31 through oil filter 32. Fryer tank 14 includes a cover 33 from which extends a steam exhaust vent 34.

Figure 5:
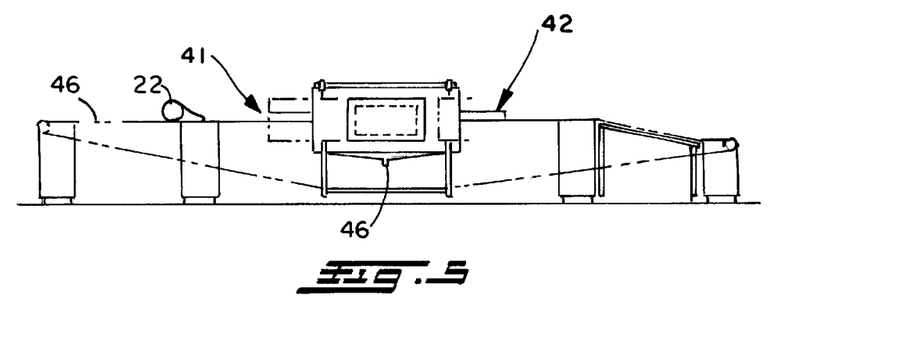
FIG. 5 is a detailed view of the microwave section of FIG. 2.

As can be seen from FIGS. 1, 2, and 5, microwave oven 11 has microwave belt 17 passing therethrough, which includes an infeed end 41 and a discharge end 42. In the preferred embodiment, microwave oven 11 is of a commercial capacity operating at 915 MHz, which is a longer wavelength than residential type microwaves that operate at 2450 MHz. This longer wavelength allows fuller penetration depth into the chicken which will be described later. In the preferred embodiment, the product opening is 40 inches wide by three inches high. As can be seen in FIG. 5, bone-in chicken 22 enters the infeed end on lower microwave belt 17 and thereafter passes to exit conveyor 45. As shown in FIG. 5, an eight-foot lead in conveyor 44 is provided as well as the 10-foot exit conveyor 45. Microwave oven 11 includes a drip pan 46 for rendering and refuse removal.

Figure 6:
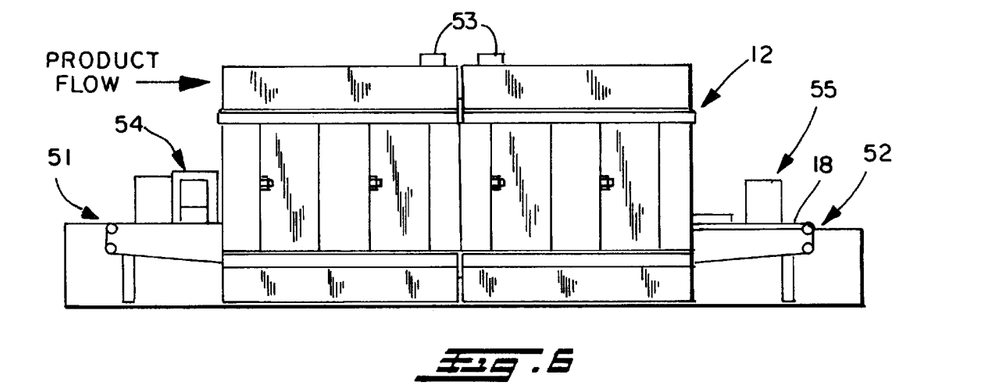
FIG. 6 is an elevation view of the convection oven of FIG. 2.
Figure 7:
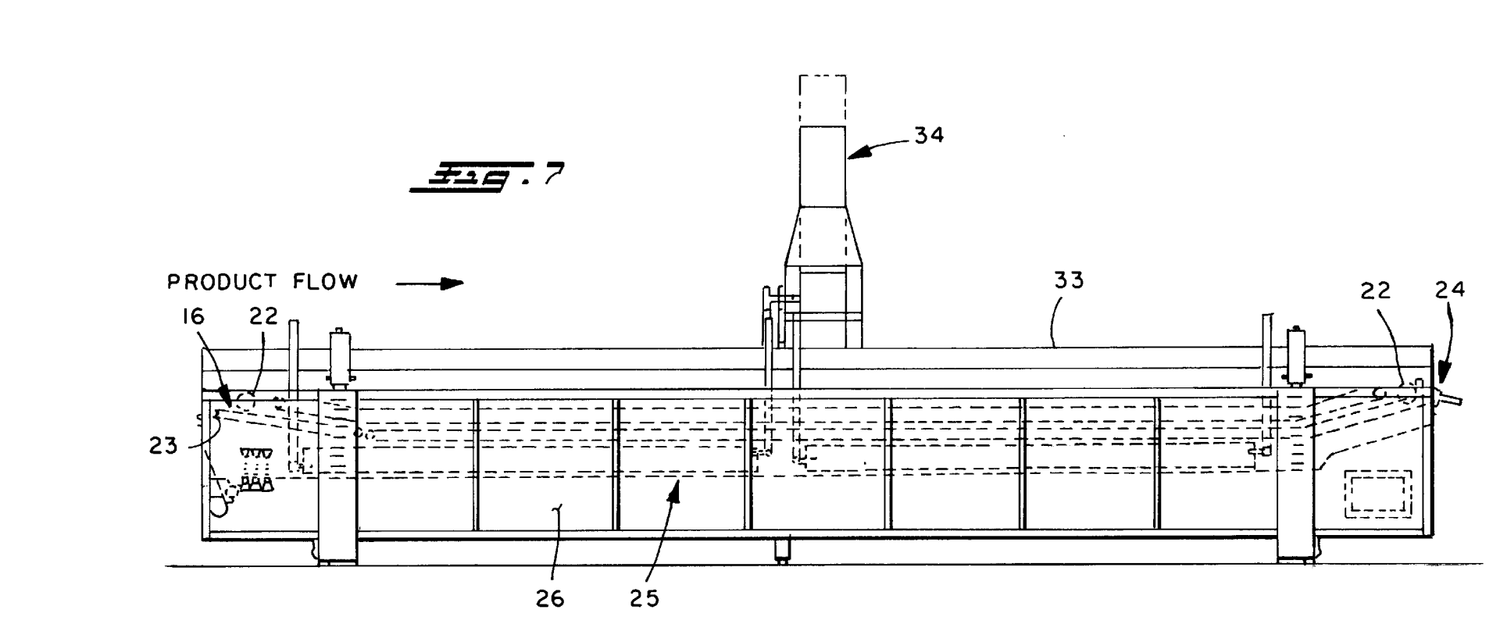
FIG. 7 is an elevation view of the fryer tank of FIG. 2.

Referring now to FIGS. 1 and 6, convection oven 12 is shown having a product infeed end 51 and product discharge end 52 at opposite ends of convection belt 18. Convection oven 12 is of the conventional high-humidity type. It includes recirculation fans 53, together with steam injection with strategically positioned nozzles (not shown) which, when included with the heat, creates a high-humidity atmosphere that will cook bone-in chicken product 22 in a desired manner. The high-humidity atmosphere demands that infeed exhaust vent 54 and discharge exhaust vent 55 are provided adjacent product infeed end 51 and discharge end 52, respectively, to continuously discharge fumes and provide humidity control.

Figure 3:
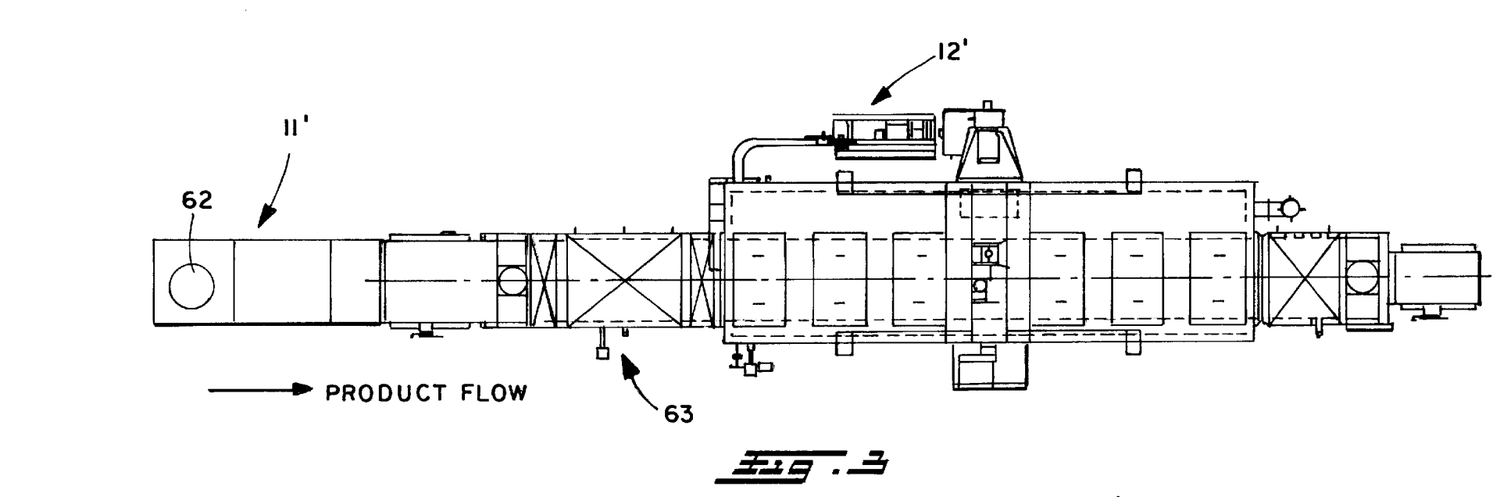
FIG. 3 is a plan view of an alternate embodiment of the cooking apparatus line practiced in the present invention.
Figure 4:
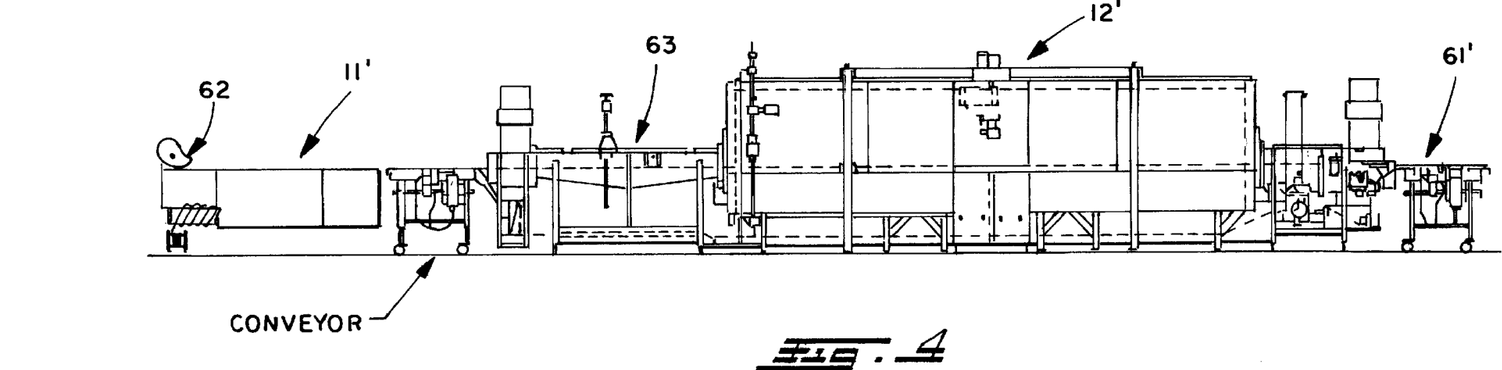
FIG. 4 is an elevation view of FIG. 3.

Referring back to FIGS. 1 and 2, it will be appreciated that a battered or breaded coating is provided on bone-in chicken product 22 upstream of infeed end 23 of fryer belt 16. The cooking sequence begins at infeed end 23 of fryer belt 16, whereupon bone-in chicken product 22 is conveyed through fryer tank 14, microwave oven 11, and convection oven 12 at a constant speed via fryer belt 16, microwave belt 17 and convection belt 18, respectively. However, to minimize possible damage to the product coating during the frying step, fryer belt 16 moves faster than belt speeds in the microwave stage 11 and convection oven stage 12 downstream. The belt loading density measured in pounds per square foot, (i.e. lb/ft$^2$) will be lower. Since the fryer stage is the initial stage, less poultry product 22 is loaded onto fryer belt 16. After the coating is set in the fryer stage 14, poultry product 22 passes to microwave belt 17 where the belt loading density is increased by virtue of poultry product passing to the slower speed conveyor. At discharge end 52 of convection oven 12, a freezer feed conveyor 61 takes bone-in chicken product 22 to the freezer and packaging process. As shown in FIGS. 1 and 2, conveyor oven 10 and conveyor 15 is comprised of a linear conveyor. However, it is contemplated that convection oven 12 may be replaced with a high humidity spiral type conveyor oven, which is well-known in the art. An alternate embodiment of the invention is shown in FIGS. 3 and 4, wherein the fryer tank has been eliminated, since an uncoated bone-in chicken product 62 is also contemplated. The sizing requirements are relatively constant between the embodiment of FIGS. 1 and 2 and the embodiment of FIGS. 3 and 4, though FIGS. 3 and 4 show a tempering chamber 63, which allows uncoated bone-in chicken product 62 to cool slightly prior to entering convection oven 12'.

Figure 8:
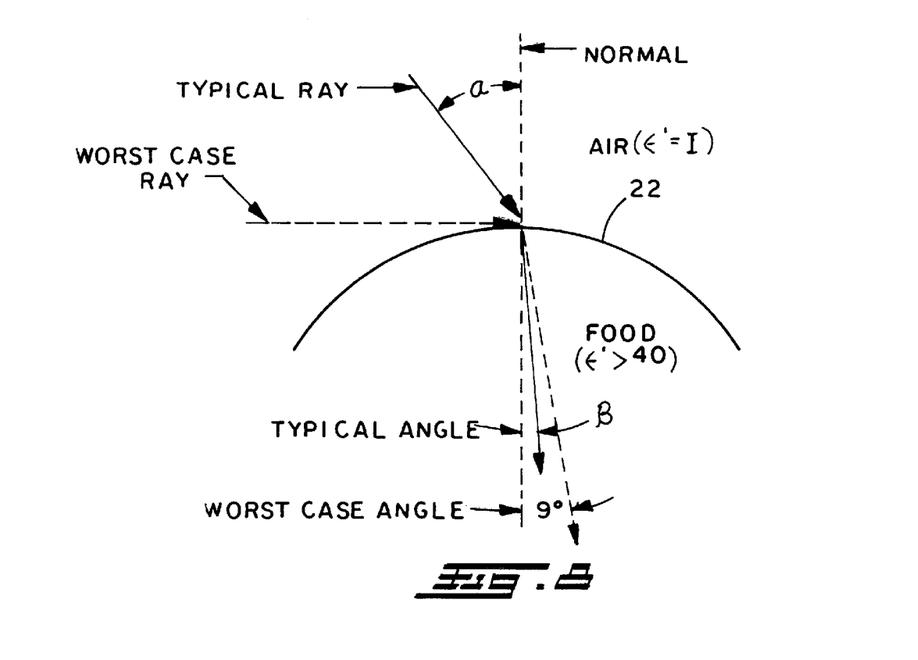
FIG. 8 is a schematic showing microwave cooking of bone-in chicken.

The present invention makes use of a phenomenon which occurs within spherical and cylindrical geometries called focusing. An example is shown in FIG. 8. Microwave signals which impinge upon a spherical food product from random directions in a microwave oven are refracted or "aimed" toward the center of the food product in high dielectric materials. Chicken is one of these high dielectric food products. The aiming phenomenon comes as a result of Snell's law, relating the angle of incidence, $\alpha$, of a wave in air ($\epsilon'=1$) to the angle of refraction (the angle inside a dielectric medium), $\beta$, as seen in FIG. 8. Snell's law is written:

$$\sin \alpha = \sqrt{\epsilon'}(\sin \beta)$$

Calculating for an incident angle of 90° will give the maximum refraction for any dielectric constant. Assuming typical dielectric constant of $\epsilon'>40$ will give a maximum refraction angle of 9°. All other angles of incidence will have refraction angles less than 9°. It should be noted that the amplitude of the internal refracted signal decreases to zero as the incidence angle approaches 90°.

Figure 9A:
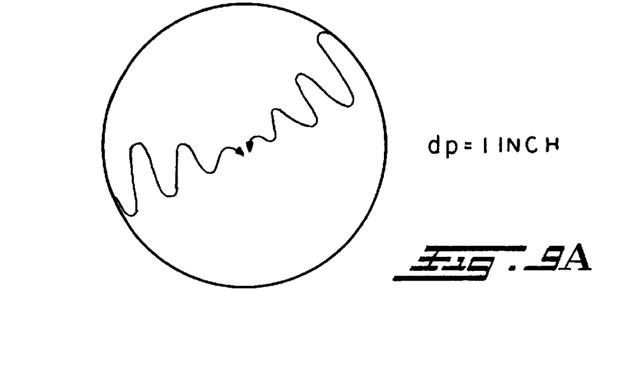
FIGS. 9A–B are detailed section taken from FIG. 8.
Figure 9B:
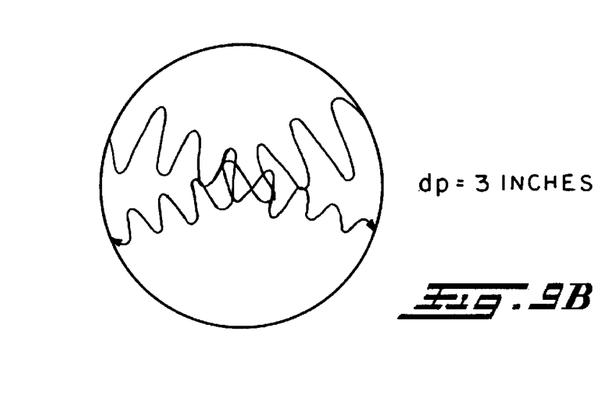

The focusing effect of these refracted rays depends directly upon the penetration depth. If the penetration depth is large compared to the dimension of a food, most of the waves, will progress through the product without being greatly attenuated. If the penetration depth (dp=1 inch) is quite small compared to the dimension of the food product, most of the energy will be absorbed within one penetration depth from the food surface, causing intense heating at the surface, but leaving the center cold (see FIG. 9A). For intermediate penetration depths (dp=3 inches), the microwave energy is not completely dissipated in the outside layer and a reasonable amount reaches the center. Because the microwave rays are entering a product through all surfaces, they all become concentrated at the center before being greatly attenuated. Thus, concentrated heating or focusing at the center will occur (see FIG. 9B). This focusing effect is the cause of center burning of, for instance, over-microwaved potatoes and the "bumping" effects seen with soups and stews in cylindrical containers. It is also what happens in spherical bone-in poultry pieces.

If one assumes all microwave energy enters radially and neglects reflection from internal boundaries, it can be seen that focusing occurs when the penetration depth is less than 1.5 times the food sphere diameter. Calculations for a cylinder yield similar values. From these calculations and measurements, it can be seen that the approximate optimum diameter for uniform heating would be equal to approximately twice the value of the penetration depth of the food.

This focusing effect is used in bone-in chicken, and indeed, in all bone-in poultry food items, since the outer surface 21 shown in FIG. 8 of bone-in chicken product is generally spherical in diameter. The microwave energy is focused at the center of the chicken, i.e. at the bone, thus effectively heating the chicken from the inside out. It is generally accepted that chicken is fully cooked when its temperature reaches 160° F. This is also considered free of microbial contamination as currently defined by the USDA. By using the focusing effect, Applicant can achieve an internal temperature at the bone of 160° in a very short period of time. Prior art processors need to exceed that 160° F. temperature in order to adequately cook both the interior and the exterior portions of the meat and in order to transform the blood surrounding the bone and bone marrow from red to purple or brown for aesthetic reasons for the consumer. The focusing effect using the microwave energy triggers a chemical reaction which transforms the color from red to purple or brown earlier in the process. Specifically, prior art conventional convection ovens generally must heat the center of the chicken to 190° F. to achieve this result. The net effect is to reduce the amount of time required to cook the chicken for both quality reasons and aesthetic reasons.

In order to size the conveyor oven process in order that bone-in poultry food items move from the microwave to the convection oven discharge end at a constant belt speed, Applicant must calculate the overall dwell time reduction for stage 2, i.e. the convection oven stage of the inventive process. It is determined as follows:

$$CF \times \frac{LMTD_{IP}}{LMTD_C} \times \frac{1}{OTF_N}$$

$LMTD_C$ is defined as the log mean temperature difference for the current process in Fahrenheit degrees between the oven operating temperature and the temperature of the food item. $LMTD_{IP}$ is the log mean temperature difference between the oven operating temperature and food item temperature in and normal out food item temperature of the inventive process in degrees Fahrenheit. CF is the correction factor for the process time reduction for stage 2 of the convection oven.

$LMTD_C$ is defined as: $\dfrac{(T_{POC} - T_{PiC})}{\ln\left[\dfrac{(T_O - T_{PiC})}{(T_O - T_{POC})}\right]}$ $LMTD_{IP}$ is defined as: $\dfrac{(T_{POC} - T_{MO})}{\ln\left[\dfrac{(T_O - T_{MO})}{(T_O - T_{POC})}\right]}$ $CF$ is defined as: $\dfrac{\ln\left[\dfrac{(T_B - T_{MO})}{(T_B - T_{CO})}\right]}{\ln\left[\dfrac{(T_B - T_{MO})}{(T_O - T_{POC})}\right]} \dfrac{(T_{POC} - T_{MO})}{(T_{CO} - T_{MO})}$ $T_{pic}$ is defined as food item input temperature for convection only process, in degrees Fahrenheit.

$T_{poc}$ is defined as food item out temperature for convection only process, in degrees Fahrenheit, which is the current conventional process.

$T_{mo}$ is defined as food item temperature out of the microwave section and into the convection oven, in degrees Fahrenheit.

$T_{co}$ is defined as food item temperature out of the convection oven, which describes stage 2 of the inventive process, in degrees Fahrenheit.

$T_o$ is the operating temperature of the convection oven optimized to deliver the desired food sensory attributes using the current process, i.e. stage 2 of the inventive process, in degrees Fahrenheit.

$T_B$ is the boiling point of water, in degrees Fahrenheit.

$OTF_N$ is the operating temperature factor, normalized. It has been determined based on above definitions and through the substitutions of appropriate numerical values as is set forth in the following Table 1:

TABLE 1

| CONVECTION OVEN OPERATING TEMPERATURE (° F.) | NORMALIZED OPERATING TEMPERATURE FACTOR |
|---|---|
| 300 | 0.919 |
| 325 | 0.946 |
| 350 | 0.967 |
| 375 | 0.984 |
| 400 | 1.000 |
| 425 | 1.013 |
| 450 | 1.023 |
| 475 | 1.033 |

Optimization Criteria:

TABLE 2

|  | Uncoated bone-in | Coated bone-in |
|---|---|---|
| Step 1 (core temperature out of the microwave section) | $T_{MO}$ | $T_{MO}$ |
| Step 2 (core temperature out of the convection oven) | $T_{CO}$ | $T_{CO}$ |

The temperature out of the microwave section ($T_{MO}$) will be set to the lowest fat/oil rendering temperature for bone-in poultry items.

$T_{CO}$=f(penetration depth, maximum product thickness)

$$d_p = \frac{\lambda_o \sqrt{\epsilon'}}{2\pi\epsilon''}$$

For commercial microwaves, $\lambda_o$ =915 MHz.

The process time (t) for a convection only linear or spiral oven is first established for a given size of product (depending on the bird size) using an empirical basis, or from an existing database. Oven operating temperatures, humidity, and air velocity are set based on product browning or sensory properties desired by the processor. Once the process time (t) for convection only is determined, the overall dwell time reduction for stage 2 of the inventive process can be determined using the formula set forth above. An example is set forth below for the stage 2 new dwell time for the convection oven:

$$t_N = t_1\left(CF \times \frac{LMTD_{IP}}{LMTD_C} \times \frac{1}{OTF_N}\right) = R_v t_1$$

where $R_v$ =total reduced process time for stage 2. Therefore, the line length in feet can be established based on the concurrent convection only process using the equation:

$$L = \frac{M_1 t_1}{5 W m y}$$

where:

$M_1$=throughput or output rate (lb/hr)

m=belt loading factor (lb/ft$^2$)

w=effective width of oven (inches)

$y_1$=weight of food items out per weight of food items in

L=length of oven (feet)

Thus, the new oven line can consist of two independent sections. $L_M$ is the microwave section and $L_C$ is the shorter linear connection oven. The total length will equal the microwave section plus the convection oven, as follows:

$$L=L_M+L_C$$

Because microwave oven section 11 cooks considerably faster than convection oven section, there is flexibility on the length of $L_M$ provided the belt speed of product out of the section is matched with the belt speed of the new convection oven. The length flexibility of the microwave section is a result of a given food item's temperature rise being directly proportional to its intensity. The intensity is defined as the dwell time in minutes in the microwave section times the power input in kilowatts, defined as:

$$L_M = f(t_m, P_{MW}, S_C)$$

where:

$t_M$=dwell time for the microwave (minutes)

$P_{MW}$=power input (kilowatts)

$S_C$=belt speed (new convection oven (ft/min.)

Thus, for the oven section to function properly, if the belt speed of the microwave section is $S_{MV}$, in feet/minute, then the belt speed in the new convection (stage 2) should be $S_C = S_{MV} + 0.5$ ft/min. for any given uniform belt loading condition, m being in lbs/ft$^2$. Thus, $S_C$ is approximately equal to $S_{MV}$.

Therefrom, the length of the conveyor through convection oven 12, stage 2 can be calculated as follows:

$$L_C = \frac{M_1 t_1}{5 W m y}\left[ CF \times \frac{LMTD_{IP}}{LMTD_C} \times \frac{1}{OTF_F}\right] = \frac{M_1 R_V t_1}{5 W m y} = R_V L$$

where:

$$R_V = \left[ CF \times \frac{LMTD_{IP}}{LMTD_C} \times \frac{1}{OTF_F}\right]$$

and the length of the microwave section can be calculated as follows:

$$L_M = L - R_V\left[\frac{M_1 t_1}{5 W m y}\right] = L - R_V L = L(1 - R_V)$$

The length of the currently available industrial model microwave sections is 13 feet. Thus, the potential convection stage 2 length for increased food items throughput, $L_{CP}$, can be calculated.

EXAMPLE

Using the above formulations, an actual continuous oven process can be achieved as set forth in the following example:

Assume that a food processor has determined using an empirical basis, that the oven operating temperature to deliver certain food item attributes for a convection only process for uncoated bone-in chicken to be 400° F. ($T_o$) (Note: the humidity, fan speed, air flow velocity, air flow distribution and heat transfer rate are set according to desired organoleptic properties.)

Given:

Product—uncoated bone-in chicken

Product inlet core temperature=35° F. ($T_{PiC}$)

Product out core temperature=190° F. ($T_{poC}$)

Process time (based on test)=15 minutes

Product yield (at the desired outcome)=0.82

Available total cook length=80 feet

Effective width of processing line=40 inches

Belt loading density=3.0 lbs/ft$^2$

Assume yield loss (1−y) can be described by the following relationship at optimized conditions: product yield loss= (1−y)=0.0045 ($T_{PO}$−120) 0.8683

Determine:

1. Throughput of product using an existing high humidity convection/conduction only process.

2. Throughput of product using a sequential combination invented process (independent of yield gain).

3. Potential yield gain at optimized conditions (proprietary control variables) using invented process.

4. Combined throughput gain (resulting from reduced process time and increased yield) using invented process.

Calculations:

1. Throughput with existing process:

$$= \frac{5 L W m y}{15} = \frac{5(80)(40)(3.0)(0.82)}{15} = 2624 \text{ lbs./hr.}$$

Assume a microwave/high humidity convection two-stage combination process where the transfer to the second stage is set to $T_{MO}$=130° F.

The cooking in the microwave section stage one distributes or couples energy to the entire food item without the need for a temperature difference between the surface and core as the driver of energy (required in a convection/conduction process). This helps trigger similar product quality as those from a high-humidity convection/conduction process at a lower product outlet temperature.

Assume this product outlet temperature is $T_{CO}$=170° F. (From table $OTF_N$, 400° F. =1; $T_B$=212° F.)

Calculations:

Overall oven process time reduction for stage two of the inventive process:

$$R_V = CF \times \frac{LMTD_{IP}}{LMTD_C} \times \frac{1}{OTF_N}$$

$$= \frac{\ln\left[\frac{(T_B - T_{MO})}{(T_B - T_{CO})}\right]}{\ln\left[\frac{(T_B - T_{MO})}{(T_B - T_{POC})}\right]} \times \frac{\ln\left[\frac{(T_O - T_{PiC})}{(T_O - T_{POC})}\right]}{\ln\left[\frac{(T_O - T_{MO})}{(T_O - T_{CO})}\right]} \times$$

$$\frac{(T_{POC} - T_{MO})^2}{(T_{CO} - T_{MO})(T_{POC} - T_{PiC})} \times \frac{1}{OTF_N}$$

$$= \frac{\ln\left[\frac{(212-130)}{(212-170)}\right]}{\ln\left[\frac{(212-130)}{(212-190)}\right]} \times \frac{\ln\left[\frac{(400-35)}{(400-190)}\right]}{\ln\left[\frac{(400-130)}{(400-190)}\right]} \times$$

$$\frac{(190-130)^2}{(170-130)(190-35)} \times \frac{1}{1}$$

$$= \frac{(0.6690)(0.5528)(3600)}{(1.3157)(0.2513)(6200)} \times 1$$

-continued $R_V = 0.6495$ $L_M = L(1 - R_V) = 80(1 - 0.6495) = 28.04$ feet $L_{MS} = 13$ feet (shortest commercial $MW$ section)

$L_M = L(1 - R_V) = 28.04$ feet (Note: $L_M > L_{MS}$; $L_M = L_{MS}$)

$L_{CP}$=potential convection stage two length for increased throughput. Therefore, throughput gain for the inventive process (independent of yield gain) is as follows:

$$= \frac{(L - L_{MS})}{R_V L} = \frac{(80 - 13)}{(0.6495)(80)} = 1.289$$

Based upon the above example, food items out for the inventive process results in a throughput gain (independent of food item yield gain) from 2624 lbs/hr. of bone-in poultry food to 3382 lbs/hr. The net food item yield gain resulting in less water and fat loss from a lowered product outlet temperature is 4.56%. The combination of the output and throughput gains results in 3537 lbs/hr. of bone-in chicken food items relative to an existing process of 2624 lbs/hr.

Having thus described the invention, it is claimed:

1. A continuous conveyor oven process for fully cooking bone-in poultry items comprising the steps of:
   providing a single conveyor line at a constant belt speed having a first microwave oven stage and a second convection oven stage, each stage including an infeed end and a discharge end,
   microwave cooking said bone-in poultry food items within said first microwave stage to a microwave out temperature at said microwave discharge end,
   convection cooking said bone-in poultry food items within said second convection oven stage to a convection out temperature at said convection oven discharge end, and
   conveying said bone-in poultry food items from said microwave infeed end to said convection oven discharge end at said constant belt speed, whereby said poultry food items are fully cooked.

2. The process of claim 1, including providing a fryer stage upstream of said first microwave stage and conveying said bone-in poultry food items through said fryer stage at a faster belt speed and correspondingly lower belt loading density to deliver the necessary food item throughput to said first microwave stage.

3. The process of claim 2, wherein said poultry food items are coated prior to entering said fryer stage.

4. The process of claim 1, including operating said microwave cooking step at 915 MHz.

5. The process of claim 4, wherein said microwave cooking including heating said bone-in poultry food items to a microwave out temperature of 130° F.

6. The process of claim 5, wherein said convection cooking includes heating said bone-in poultry food items to a convection out temperature of 170° F.

7. The process of claim 1, wherein said microwave cooking including heating said bone-in poultry food items to a microwave out temperature of 130° F.

8. The process of claim 1, wherein said convection cooking includes heating said bone-in poultry food items to a convection out temperature of 170° F.

9. The process of claim 1, wherein said conveyor line at said first microwave stage has a length of 13 feet.

10. The process of claim 1, wherein said single conveyor line has a length of 80 feet, whereby 25% of additional poultry item throughput is achieved.

11. A continuous conveyor oven process for fully cooking bone-in poultry items comprising the steps of:
    providing a single conveyor line at a constant belt speed having a first microwave oven stage and a second convection oven stage, each stage including an infeed end and a discharge end,
    microwave cooking said bone-in poultry food items within said first microwave stage to a minimum acceptable microwave core temperature,
    convection cooking said bone-in poultry food items within said second convection oven stage to a final convection core temperature, and
    conveying said bone-in poultry food items from said microwave infeed end to said convection oven discharge end at said constant belt speed, whereby said poultry food items are fully cooked.

12. The process of claim 11, including providing a fryer stage upstream of said first microwave stage and conveying said bone-in poultry food items through said fryer stage at a faster belt speed and correspondingly lower belt loading density to deliver the necessary food item throughput to said first microwave stage.

13. The process of claim 12, including coating said poultry food items prior to entering said fryer stage.

14. The process of claim 12, wherein said single conveyor line has a length of 80 feet, whereby 15% of additional poultry item throughput is achieved.

15. The process of claim 11, wherein said single conveyor line has a length of 80 feet, whereby 25% of additional poultry item throughput is achieved.

* * * * *